Figure 1:
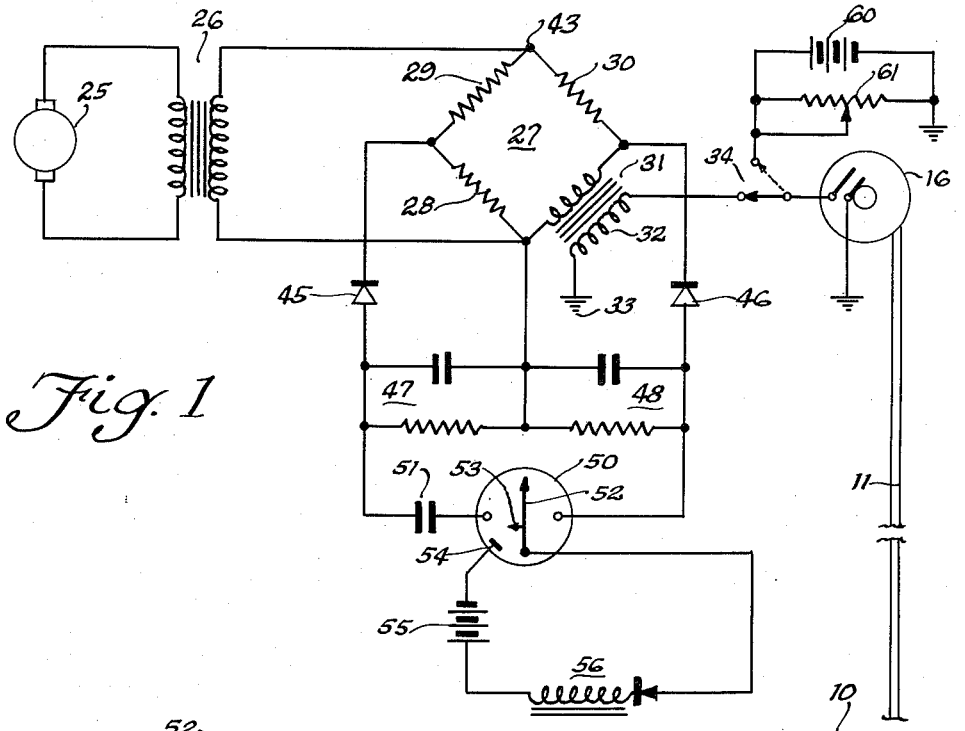

Oct. 30, 1956   J. H. CASTEL ET AL   2,768,684
WELL PERFORATING AND LOGGING METHODS AND APPARATUS
Filed Feb. 20, 1952

INVENTORS:
Jacques H. Castel
Henry C. Waters
BY
Mason, Kolehmainen, Rathburn & Wyss
Attorneys United States Patent Office 2,768,684
Patented Oct. 30, 1956

2,768,684

WELL PERFORATING AND LOGGING METHODS AND APPARATUS

Jacques H. Castel and Henry C. Waters, Houston, Tex., assignors to Perforating Guns Atlas Corporation, Houston, Tex., a corporation of Delaware Application February 20, 1952, Serial No. 272,576

14 Claims. (Cl. 164—.5)

The present invention relates to borehole logging methods and apparatus, and, more particularly, to improved methods and apparatus for the location of casing collars in cased boreholes in conjunction with other logging or drilling operations such as casing perforating and the like.

In completing a borehole in accordance with established commercial practice it is customary to take an electrical log of the borehole before the casing is set in order to determine the productive horizons in the structure through which the borehole extends. After the electrical log is taken the casing is set by connecting casing sections together by means of screw threaded collars and, in most instances, a combined gamma ray and casing collar log is taken after the casing is set. This gamma ray log is similar in many respects to the electrical log taken before the casing is set and may be correlated with the electrical log so that the position of the casing collars relative to the desirable horizons shown in the electrical log is accurately established. Accordingly, in nearly all wells, complete information is available as to each productive horizon and the location of this horizon is determined by the adjacent casing collars which are used as reference or bench marks.

As existing oil and gas formations become depleted and relatively fewer productive horizons are being discovered, it becomes increasingly important to exploit formations which are deeper in the earth, which are thinner and are of relatively less value. This is customarily done in existing wells by perforating the well casing by means of various types of perforating guns which fire bullets or jets into and through the well casing at points opposite the desired horizons to open up the casing at these points and permit the oil to flow into the well. In order to do this some means must be provided to determine accurately the depth of the perforating gun before it is fired. While depth measuring sheaves are customarily used for this purpose, they are not sufficiently accurate, due to stretching of the cable, variations due to temperature, density of the mud, and the like, to locate relatively thin formations which are only a few feet thick. However, the depth measuring sheave is capable of determining the proximate depth so that it is only necessary to tie in the position of the perforating gun with one of the adjacent casing collars, after which the depth measuring sheave or odometer can be readjusted for the correct depth of the adjacent casing collar and reference is then made to the original electrical log as correlated with the gamma ray and casing collar log for the accurate location of the perforating gun relative to the desired horizon.

While it is desirable to provide a simple collar logging system which may be carried with the perforating gun as a unit and which may be controlled over the conventional single conductor cable which supports the gun, it is absolutely essential that the collar locating apparatus be incapable of firing the perforating gun during the initial collar logging operation. Otherwise the casing will be perforated at the wrong place and will require either an expensive squeeze job of cementing, or, in some instances, the well may be lost entirely. It is also essential to provide a collar locating system and apparatus which is extremely rugged to withstand the terrific mechanical shocks to which it is subjected during the perforating operation, and also to withstand the tremendous hydrostatic pressures which are encountered in deep boreholes.

Accordingly, it is a primary object of the present invention to provide a new and improved casing collar locating system which is of simple, economical, and rugged construction, is designed for operation on a single conductor cable, and is adapted to operate in conjunction with other borehole instruments, particularly instruments of the perforating gun type.

It is another object of the present invention to provide a combined casing collar locating and perforating gun firing system wherein the collar locating apparatus is particularly adapted to withstand mechanical shocks encountered during the perforating operation.

It is a further object of the present invention to provide a new and improved casing collar locating system which may be operated in conjunction with a perforating gun system on a single conductor cable and wherein means are provided for positively preventing the false or premature firing of the perforating gun during the casing collar logging operation and the accurate positioning of the gun.

Another object of the present invention resides in the provision of a new and improved casing collar logging system which is particularly adapted to prevent false casing collar indications which may be due to changes in the impedance of the earth return path and which may result from changes in the galvanic effect thereof.

Still another object of the present invention resides in the provision of a combined casing collar logging and perforating gun firing system wherein the casing collar logging apparatus may be controlled over the same single conductor cable as the perforating gun but is effectively isolated from the gun so as positively to prevent false or premature firing of the gun during the casing collar logging operation.

Figure 2:
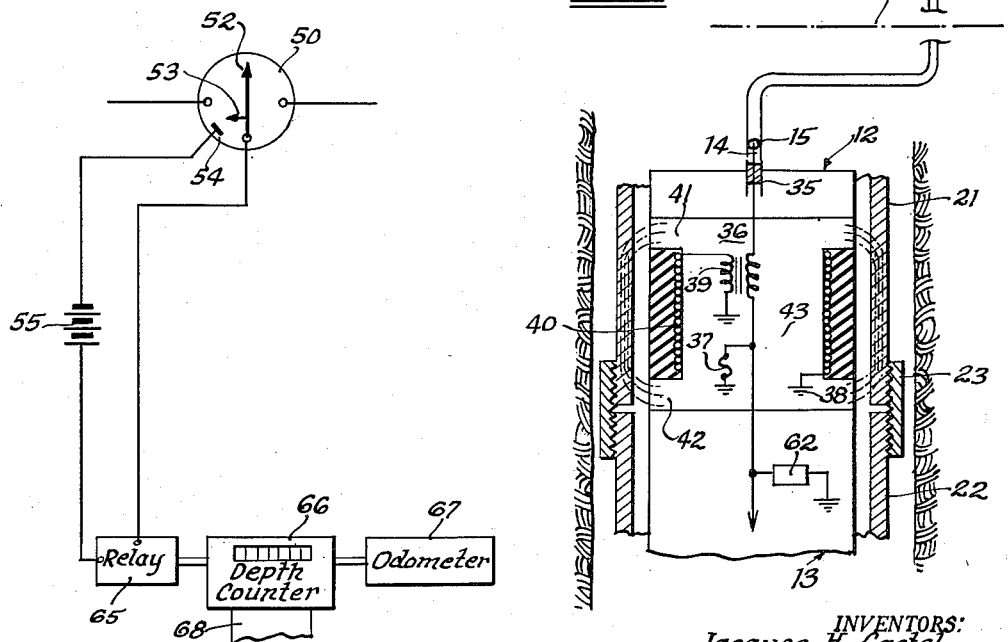

The invention, both as to its organization and method of operation, together with further objects and advantages thereof, will best be understood by reference to the following specification taken in connection with the accompanying drawing, in which:

The Fig. 1 is a somewhat diagrammatical illustration of the improved casing collar logging system of the present invention shown in conjunction with a perforating gun apparatus and Fig. 2 is a diagrammatic illustration of an alternative embodiment of the invention wherein a permanent record of casing collars is provided.

Referring now to the drawing, the equipment shown above the broken line 10 in the drawing comprises the surface equipment located at the surface of the earth, and the equipment shown below the line 10 constitutes the borehole apparatus which is supported on a suitable single conductor cable 11. In the illustrated embodiment the subsurface equipment comprises the collar logging apparatus indicated generally at 12 and a perforating gun and associated equipment indicated generally at 13, which are secured together and supported by the cable 11. In this connection it will be understood that the cable 11 comprises a single central conductor 14 and the usual armored sheath 15 and is carried on a suitable power-operated drum or reel 16 located at the surface of the earth whereby the cable is adapted to be fed out or reeled in so as to move the subsurface equipment longitudinally in the borehole. The cable 11 serves electrically to connect the surface equipment and the down-the-hole equipment comprising the collar logging apparatus 12 and the perforating gun apparatus 13. While the armored sheath 15 of the cable 11 is grounded at the earth's surface through the supporting reel 16, it will be understood that the subsurface equipment is moved up and down within the casing sections 21 and 22 in the borehole 20 and the sections 21 and 22 are filled with a drilling mud or fluid so that the return current path is primarily through the casing of the subsurface equipment, the drilling mud, the casing itself and through the earth to the ground connections made at the surface equipment. A conventional odometer or other depth measuring device may be connected to the reel 16 for automatically indicating or recording the length of cable within the borehole at any given instant. As described in detail hereinafter, this odometer may be employed in conjunction with the apparatus of the present invention to provide an efficient and accurate location of a particular casing collar adjacent the desired horizon.

The surface equipment comprises a suitable alternating current generator 25 which is adapted to produce a relatively high-frequency alternating current, preferably in the order of 400 C. P. S., which is impressed upon the primary of a power transformer 26. The generator 25 may comprise a vacuum tube oscillator of any conventional circuit design, such as plate to grid feedback, which is adjusted for the proper operating frequency and, in accordance with one feature of the present invention, is provided with an oscillator tube having a maximum power output of a relatively small value, preferably in the order of one watt. As will be described in more detail hereinafter, it is particularly important in accordance with the present invention to provide a generator 25, the power output of which is limited to a relatively small value and a vacuum tube oscillator is a convenient means of obtaining such power limitations.

The secondary winding of the transformer 26 is utilized to supply power to a Wheatstone bridge circuit indicated generally at 27. More specifically, the bridge circuit 27 comprises the resistance arms 28, 29, and 30 and a coupling transformer 31, the primary of which is connected as the fourth leg of the bridge 27. The secondary 32 of the coupling transformer 31 is connected to ground as indicated by the conventional ground symbol 33, and the other end of the winding 32 is connected through the selector switch 34 to the center conductor 14 of the cable 11. The voltage produced across the secondary of the power transformer 26 produces current flow through the parallel connected sides of the bridge, i. e., the resistors 28 and 29, which are in parallel with the primary winding of the transformer 31 and the resistor 30. As a result, an alternating current voltage is produced across the secondary of the transformer 32 even though the bridge 27 is balanced.

In the subsurface equipment the center conductor 14 of the cable 11 is connected through a high pressure insulating pin 35 to the primary of an isolating transformer 36, the other side of the primary winding of the transformer 36 being grounded through the low resistance fuse 37 to the casing of the collar logging unit 12. In this connection it will be understood that the armored sheath of the cable 11 is connected to the casing of the collar logging unit 12 and the perforating gun unit 13 and both of these casings are grounded both at the earth's surface through the armored shield 15 of the cable 11 and through the drilling mud within the casing itself.

The collar locating unit 12 includes the single collar locator coil 40 which comprises a single-layer solenoid-wound coil, one end of which is connected to the casing of the unit 12, as indicated at 38, so that one end of the coil 40 is grounded, and the other end of the coil 40 is connected to the secondary winding 39 of the transformer 36, the other end of the winding 39 also being connected to ground through the casing of the unit 12. In this connection it will be understood that the collar logging unit 12, which is shown somewhat diagrammatically in the drawing, actually comprises a mandrel of magnetic material including the pole pieces 41 and 42 which are connected on either end of the yoke 43, the coil 40 being wound around the yoke 43 and being covered with suitable insulating material to prevent damage thereto during use. Also it will be understood that the transformer 39 and the fuse 37 are connected in the manner shown in the drawing within the hollow yoke 43 by any suitable mechanical means. Preferably the fuse 37 is connected in the circuit in the manner shown by means of suitable clip-type receptacles so that the fuse 37 may be replaced when it is burned out during the perforating gun firing operation as will be described in more detail hereinafter.

Considering now the operation of the collar logging unit 12, it will be understood that the voltage produced across the secondary winding 32 of the coupling transformer 31 at the earth's surface is transmitted over the cable 11 and coupled through the transformer 36 to the secondary 39 thereof so as to transmit a relatively high current through the collar locating coil 40. This large 400 cycle current flowing in the coil 40 sets up an alternating current magnetic field about this coil which links the casing sections 21 and 22 and induces eddy currents therein. In this connection it will be understood that a single layer collar locating coil 40 is desirable since the hydrostatic pressure encountered in deep wells is very great and if a multi-layer coil is used this pressure may be sufficient to crush the innermost layers of the coil, thus parting the insulation thereof and causing a short circuit of a portion or all of the coil.

Since the coil 40 is a single layer coil, for the reasons described immediately above and the length thereof is limited for practical purposes, it is obvious that the impedance of the coil 40 is relatively small. In order to produce a detectable change in the impedance of the coil 40, it is necessary to provide a relatively large current flow through this coil and in accordance with the present invention the isolating transformer 36 is provided to produce a relatively large current flow through the coil 40 without requiring a large current flow through the single conductor cable 11. In this connection it will be understood that if a large current is transmitted over the cable 11 greater interference due to noise voltages and the like is experienced. Also, if a low impedance collar locating coil is connected directly in series with the cable 11 the change in inductance and resistance of the cable 11 as it is reeled in and out has more effect and tends to produce erroneous collar indications.

The impedance of the collar locating coil 40 remains substantially the same so long as the collar locating unit 12 moves vertically in a homogenous section of the casing. However, any metallic anomaly, such as the casing collar 23, will cause a change in the impedance of the collar locator coil 40 in part due to a change in the inductance of the coil 40 and in part due to a change in the losses caused by the eddy currents in the adjacent metallic structure. The impedance change of the coil 40 is reflected back through the isolating transformer 36 to the primary winding thereof, which winding is connected in series with the secondary winding 32 of the coupling transformer 31. As a result there is produced a corresponding change in current through the primary winding of the transformer 31 which produces an unbalance of the bridge circuit 27.

The output of the bridge circuit 27 is connected to the full wave rectifier circuit including the rectifiers 45 and 46 which are respectively connected to the R. C. load networks 47 and 48 connected in series between the cathodes of the rectifiers 45 and 46 and the common junction of the networks 47 and 48 is connected to the junction of the resistor 28 and the primary of the transformer 31. Thus, when the bridge 27 is balanced the rectifier 45 operates to produce a voltage across the load network 47 which is of the same amplitude and is of opposite polarity to the voltage produced across the network 48 by the rectifier 46. The sum of the voltages produced across the networks 47 and 48 is impressed upon an ammeter 50 and coupling condenser 51, connected in series relation. Thus the condenser 51 is charged to the net D. C. voltage appearing across the series connected networks 47 and 48 and the meter 50 indicates the charging current for the condenser 51.

When the collar locating coil 40 traverses one of the casing collars 23, the impedance of this coil changes due both to the self-inductance of the coil and to the change in the losses caused by the eddy currents within the casing and the casing collar. This abrupt change in impedance is reflected back through the series-connected transformers 36 and 31 to the Wheatstone bridge 27 so as to produce an unbalance therein. As a result, the voltage produced across the load network 48 changes so that the condenser is charged to a different value and the needle 52 on the meter 50 is moved so as to close the contacts 53 and 54, at the same time indicating the presence of a casing collar. In this connection it will be understood that the contact 53 is carried by the movable arm of the meter 50 and the contact 54 is fixed, the current range of the meter being so chosen as to close the contacts 53 and 54 when the bridge 27 is abruptly unbalanced in response to casing collar traversal.

When the contacts 53 and 54 are closed in the manner described above, a circuit is established from the battery 55 through the contacts 53 and 54 to a buzzer circuit indicated generally at 56 so that an audible signal is produced which the operator can hear and which informs him that a casing collar is being traversed. The depth reading on the odometer connected to the reel 16 may then be read and recorded at the moment the buzzer 56 is energized so that the exact location of the subsurface equipment is obtained.

In order to provide a sufficiently large signal at the earth's surface to operate the Wheatstone bridge 27 satisfactorily while employing collar locator coil 40 of low impedance, it is necessary that the primary winding of the transformer 36 be connected directly to ground from the center conductor of the cable 11 so that substantially the entire voltage transmitted down the cable will be impressed across the primary of the transformer 36. On the other hand, it is necessary to provide a control circuit for firing the perforating gun 13 over the single conductor cable 11 after the equipment has been accurately positioned at the desired horizon. In accordance with the present invention there is provided the low resistance high current fuse 37 which is connected from the bottom end of the primary winding of the transformer 36 to the casing of the collar logging unit 12 and hence to ground. During the collar logging operation the fuse 37, which preferably has a resistance of a fraction of an ohm, is connected to the casing of the unit 12 so that substantially no voltage is transmitted to the perforating gun unit 13.

After the desired casing collars have been located by means of the collar logging unit 12 and in accordance with the above-described procedure, it is then necessary to clear the cable 11 so that the perforating gun 13 may be fired in accordance with any conventional technique. In this connection it will be understood that the collar logging system of the present invention may be employed in conjunction with any conventional depth measuring equipment to locate the casing collar or collars adjacent the desired horizon after the subsurface equipment has been approximately positioned adjacent the horizon as indicated on the conventional depth measuring equipment. Accordingly, the collar logging unit is in some instances employed for a relatively short length of casing so that the impedance changes which result from reeling in and reeling out the cable 11 are of substantially no effect. However, the collar logging unit may be employed to log a substantial portion of the casing in which case the inductance of the cable will change due to a reduced number of turns, and the resistance thereof also changes due to the change in length and temperature. However, these changes are relatively gradual and, while they will produce an unbalance of the bridge 27, the unbalance is so gradual that the charging current for the meter 50 is very small and the meter is not deflected sufficiently to close the contacts 53, 54. On the other hand, when a casing collar is traversed, the abrupt unbalance of the bridge 27 causes a relatively large charging current to flow through the meter 50 so that the contacts 53 and 54 are closed and the indicator circuit is energized.

In order to disconnect the casing collar logging unit 12 so that the perforating gun equipment 13 may be fired, the selector switch 34 is thrown to the position in which the battery 60 at the earth's surface is connected to the upper end of the supporting cable 11. The battery 60 is preferably of sufficient power to produce a relatively high current flow over the cable 11, through the primary of the transformer 36, and through the fuse 37 so that this fuse is blown and the center conductor of the cable 11 is no longer connected to ground through this fuse. After the fuse 37 is burned out any suitable means may be employed to fire the perforating gun 13. For example, the potentiometer 61 may be adjusted so that the current transmitted over the cable 11 is raised to a sufficiently high value to detonate one of the firing caps 62 in the perforating gun 13, this cap being connected from the center conductor to the casing of the perforating gun unit 13 and hence to ground potential over the above described path. In this connection it will be understood that any other suitable system may be employed for firing the perforating gun unit 13 after the cable 11 is cleared. For example, a sequential system of firing the gun such as is shown and described in detail in a copending application Serial No. 219,480, filed April 5, 1951, which is assigned to the same assignee as the present invention may be employed when the selector switch 34 is thrown to the perforating gun firing position.

In accordance with an alternative embodiment of the present invention, the location of casing collars may be performed automatically by substituting a relay 65 for the buzzer circuit 56 as shown in Fig. 2. A recording depth counter 66 is employed, which is driven from the conventional odometer 67 connected to the reel equipment 16 by a suitable selsyn system so that it is in synchronism with the odometer of the winch truck. A paper tape 68 is run into the depth counter 66 and the relay 65 is employed to actuate a lever which in turn prints on the paper tape 68 the depth of the casing collar each time the relay is energized in response to an unbalance of the Wheatstone bridge 27. Obviously, other systems may be employed to record the casing collar depth, as a function of the unbalance of the bridge circuit by means of a suitable recorder, volt meter or ammeter.

From the foregoing it will be evident that the present invention provides a simple, economical and reliable collar logging unit for locating casing collars which is exceptionally rugged and may be employed in conjunction with perforating gun apparatus or other well logging tools to position the tool accurately within the casing. A single layer collar locating coil is provided to reduce the effects of hydrostatic pressure and the relatively low output of the coil is stepped up by means of an isolating transformer and a relatively low power generator at the surface is employed to detect changes in the impedance of the coil. A vacuum tube oscillator circuit is employed as a generator which is incapable of providing sufficient power to fire the perforating gun equipment so that false or premature firing of the perforating gun is positively prevented in the system of the present invention. Furthermore, the collar locating equipment is isolated by means of an extremely low resistance fuse during the collar logging operation so that a perforating gun which employs low resistance firing caps is not affected during the recording of casing collar locations and the accurate positioning of the subsurface equipment.

While particular embodiments of the invention have been shown, it will be understood, of course, that the invention is not limited thereto, since many modifications may be made and it is therefore contemplated by the appended claims to cover any such modifications as fall within the true spirit and scope of the invention.

What is claimed and desired to be secured by Letters Patent is:

1. A casing collar locating system, comprising a collar locator coil, a single conductor cable supporting said coil within a casing for longitudinal movement therethrough, a bridge circuit at the earth's surface and including one winding of a coupling transformer in one arm thereof, an isolating transformer, means connecting the other winding of said coupling transformer, the single conductor of said cable and one winding of said isolating transformer in series, means connecting said collar locating coil across the other winding of said isolating transformer, a source of high frequency alternating current for energizing said bridge circuit, and means for indicating unbalance of said bridge circuit resulting from a change in the impedance of said coil as said coil traverses a casing collar.

2. A casing collar locating system, comprising a single-layer collar locator coil, a single conductor cable supporting said coil within a casing for longitudinal movement therethrough, a bridge circuit at the earth's surface and including one winding of a coupling transformer in one arm thereof, an isolating transformer, means connecting the other winding of said coupling transformer, the single conductor of said cable and one winding of said isolating transformer in series, means connecting said collar locating coil across the other winding of said isolating transformer, a source of high frequency alternating current for energizing said bidge circuit, means for rectifying the output of said bridge circuit to provide a unidirectional control voltage in response to each unbalance thereof, and means controlled by said control voltage for producing an audible signal each time said bridge circuit is unbalanced due to a change in the impedance of said collar locating coil as said coil traverses a casing collar.

3. A casing collar locating system, comprising a single-layer collar locator coil, a single conductor cable supporting said coil within a casing for longitudinal movement therethrough, a bridge circuit at the earth's surface and including one winding of a coupling transformer in one arm thereof, an isolating transformer, means connecting the other winding of said coupling transformer, the single conductor of said cable and one winding of said isolating transformer in series, means connecting said collar locating coil across the other winding of said isolating transformer, a source of high frequency alternating current for energizing said bridge circuit, means for rectifying the output of said bridge circuit to provide a unidirectional control voltage in response to each unbalance thereof, a meter having a movable contact on the indicating arm thereof and an associated fixed contact, a condenser connected in series with said meter, and means for impressing said control voltage on said series connected condenser and meter, whereby said indicating arm is deflected and said contacts closed each time said bridge circuit is unbalanced due to a change in the impedance of said collar locating coil as said coil traverses a casing collar.

4. A casing collar locating system, comprising a single-layer collar locator coil, a single conductor cable supporting said coil within a casing for longitudinal movement therethrough, a bridge circuit at the earth's surface and including one winding of a coupling transformer in one arm thereof, an isolating transformer, means connecting the other winding of said coupling transformer, the single conductor of said cable and one winding of said isolating transformer in series, means connecting said collar locating coil across the other winding of said isolating transformer, a source of high frequency alternating current for energizing said bridge circuit, means for rectifying the output of said bridge circuit to provide a unidirectional control voltage in response to each unbalance thereof, a meter having a movable contact on the indicating arm thereof and an associated fixed contact, a condenser connected in series with said meter, means for impressing said control voltage on said series connected condenser and meter, whereby said indicating arm is deflected and said contacts closed each time said bridge circuit is unbalanced due to a change in the impedance of said collar locating coil as said coil traverses a casing collar, and means operative when said contacts are closed for producing an audible signal.

5. A casing collar locating system, comprising a single-layer collar locator coil, a single conductor cable supporting said coil within a casing for longitudinal movement therethrough, a bridge circuit at the earth's surface and including one winding of a coupling transformer in one arm thereof, an isolating transformer, means connecting the other winding of said coupling transformer, the single conductor of said cable and one winding of said isolating transformer in series, means connecting said collar locating coil across the other winding of said isolating transformer, a source of high frequency alternating current for energizing said bridge circuit, means for rectifying the output of said bridge circuit to provide a unidirectional control voltage in response to each unbalance thereof, a recording depth meter controlled in synchronism with the position of said collar locating coil, and means controlled by said control voltage for actuating said meter each time said bridge circuit is unbalanced due to a change in the impedance of said coil as said coil traverses a casing collar to record the collar depth.

6. A combined casing collar locating and perforating gun firing system, comprising a perforating gun having firing means responsive to a predetermined minimum current, an inductive element, a single conductor cable supporting said inductive element and said gun within a casing for longitudinal movement therethrough, a bridge circuit at the earth's surface, means including said cable for connecting said inductive element in one arm of said bridge circuit, a source of high frequency current for energizing said bridge circuit, the maximum power output of said source being many times less than the power required to produce a current flow through said inductive element of sufficient magnitude to excite said firing means, means for indicating unbalance of said bridge circuit resulting from a change in the impedance of said inductive element as said element traverses a casing collar, a source of unidirectional potential of sufficient power output to produce said minimum current through said firing means, and switch means for selectively connecting said bridge circuit and said unidirectional source to the upper end of said cable.

7. A combined casing collar locating and perforating gun firing system, comprising a perforating gun having firing means responsive to a predetermined minimum firing current, a collar locator coil, a single conductor cable supporting said coil and said gun within a casing for longitudinal movement therethrough, a bridge circuit at the earth's surface, an isolating transformer, means including the single conductor of said cable and said isolating transformer for connecting said coil in one arm of said bridge circuit, a source of high frequency current for energizing said bridge circuit, the maximum power output of said source being less than the power required to produce a current flow over said cable of sufficient magnitude to excite said firing means, means for indicating unbalance of said bridge circuit resulting from a change in the impedance of said coil as said coil traverses a casing collar, a control circuit at the earth's surface, means including the single conductor of said cable for connecting said control circuit in circuit with said firing means, and means included in said control circuit for firing said firing means.

8. A combined casing collar locating and perforating gun firing system, comprising a perforating gun having firing means responsive to a predetermined minimum firing current, a collar locator coil, a single conductor cable supporting said coil and said gun within a casing for longitudinal movement therethrough, a bridge circuit at the earth's surface and having a coupling transformer in one arm thereof, an isolating transformer, means including the single conductor of said cable and said isolating transformer for effectively connecting said collar locator coil across one winding of said coupling transformer, a source of high frequency alternating current for energizing said bridge circuit, the maximum power output of said source being insufficient to produce a current flow through said isolating transformer which is equal in magnitude to said predetermined minimum firing current, means for indicating unbalance of said bridge icrcuit resulting from a change in the impedance of said coil as said coil traverses a casing collar, a potential source at the earth's surface of sufficient power output to produce said minimum firing current through said firing means, and switch means for selectively connecting said coupling transformer and said potential source to the upper end of said cable.

9. A combined casing collar locating and perforating gun firing system, comprising a perforating gun having firing means responsive to a predetermined minimum firing current, a collar locator coil, a single conductor cable supporting said coil and said gun within a casing for longitudinal movement therethrough, a bridge circuit at the earth's surface and having a coupling transformer in one arm thereof, an isolating transformer, means including the single conductor of said cable and said isolating transformer for effectively connecting said collar locator coil across one winding of said coupling transformer, means connecting said firing means in circuit with said isolating transformer, means normally short circuiting said firing means, a source of high frequency alternating current for energizing said bridge circuit, the maximum power output of said source being insufficient to produce a current flow through said isolating transformer which is equal in magnitude to said predetermined minimum firing current, means for indicating unbalance of said bridge circuit resulting from a change in the impedance of said coil as said coil traverses a casing collar, means at the earth's surface for removing the short circuit on said firing means, thereby to condition said firing means for detonation, and means operative after said short circuit is removed for firing said firing means.

10. A combined casing collar locating and perforating gun firing system, comprising a perforating gun having firing means responsive to a predetermined minimum firing current, a collar locator coil, a single conductor cable supporting said coil and said gun within a casing for longitudinal movement therethrough, a bridge circuit at the earth's surface and having a coupling transformer in one arm thereof, an isolating transformer, a low resistance fuse member, means connecting said coupling transformer, the single conductor of said cable, said isolating transformer and said fuse member in series, means connecting the firing means of said perforating gun in parallel with said fuse member, a source of high frequency alternating current for energizing said bridge circuit, the maximum power output of said source being insufficient to produce a current flow over said cable which is equal in magnitude to said predetermined minimum firing current, means for indicating unbalance of said bridge circuit resulting from a change in the impedance of said coil as said coil traverses a casing collar, means at the earth's surface for impressing a current on the single conductor of said cable of sufficient magnitude to burn out said fuse member and clear said firing means, and means at the earth's surface for firing said firing means, after said fuse member is burned out.

11. A combined casing collar locating and perforating gun firing system, comprising a perforating gun having firing means responsive to a predetermined minimum firing current, a collar locator coil, a single conductor cable supporting said coil and said gun within a casing for longitudinal movement therethrough, a bridge circuit at the earth's surface and having a coupling transformer in one arm thereof, an isolating transformer, a low resistance fuse member, means connecting said coupling transformer, the single conductor of said cable, said isolating transformer and said fuse member in series, means connecting the firing means of said perforating gun in parallel with said fuse member, a source of high frequency alternating current for energizing said bridge circuit, the maximum power output of said source being insufficient to produce a current flow over said cable which is equal in magnitude to said predetermined minimum firing current, means for indicating unbalance of said bridge circuit resulting from a change in the impedance of said coil as said coil traverses a casing collar, and means at the earth's surface for impressing a current on the single conductor of said cable of sufficient magnitude to burn out said fuse member and fire said firing means.

12. A casing logging system, comprising a locator coil, a cable supporting said coil within a casing for longitudinal movement therethrough, a bridge circuit at the earth's surface, means including said cable for connecting said locating coil in one arm of said bridge circuit, a source of alternating current for energizing said bridge circuit, and rate of change responsive indicating means connected to the output of said bridge circuit for indicating only an unbalance thereof having a rate of change greater than a predetermined minimum value, whereby said indicating means is substantially nonresponsive to changes in the impedance of said cable as said coil traverses the casing and is responsive to changes in the impedance of said coil as said coil traverses a metallic anomaly in said casing.

13. A casing logging system, comprising a locator coil, a cable supporting said coil within a casing for longitudinal movement therethrough, a bridge circuit at the earth's surface, means including said cable for connecting said locating coil in one arm of said bridge circuit, a source of alternating current for energizing said bridge circuit, means for rectifying the output of said bridge circuit to provide a unidirectional control voltage in response to unbalance thereof, and indicating means responsive only to a predetermined minimum rate of change of said control voltage for indicating changes in the impedance of said coil as said coil traverses a metallic anomaly in said casing.

14. A combined casing collar locating and perforating gun firing system, comprising a perforating gun having firing means responsive to a predetermined minimum firing current, an inductive member, a single conductor cable supporting said inductive element and said gun within a casing for longitudinal movement therethrough, a transformer having one winding thereof connected in circuit with said firing means and another winding connected to said inductive member, means at the earth's surface for supplying an alternating current over the single conductor of said cable to said one winding of said transformer which is smaller than said predetermined minimum firing current, said alternating current supply means having a maximum power output which is substantially less than the power required to produce a current flow through said one winding of sufficient magnitude to excite said firing means, said alternating current flow through said one winding of said transformer producing a substantially larger current flow through said inductive member, means at the earth's surface for indicating changes in the impedance of said inductive member as said member traverses a casing, a substantially unidirectional potential source at the earth's surface of sufficient power to produce said minimum firing current through said firing means, and means for connecting said potential source to said cable in place of said alternating current supply means.

References Cited in the file of this patent

UNITED STATES PATENTS

| | | |
|---|---|---|
| 1,835,722 | Rembert | Dec. 8, 1931 |
| 2,250,703 | Crites | July 29, 1941 |
| 2,470,828 | Millington | May 24, 1949 |
| 2,558,427 | Fagan | June 26, 1951 |
| 2,602,833 | Swift | July 8, 1952 |